(12) United States Patent
Leberle et al.

(10) Patent No.: US 9,819,247 B2
(45) Date of Patent: Nov. 14, 2017

(54) COOLING JACKET FOR AN ELECTRIC MOTOR OR GENERATOR HAVING COOLANT INLET AND OUTLETS WITH OPPOSITE FLOW DIRECTION STREAMS

(71) Applicant: VOLKSWAGEN AG, Wolfsburg (DE)

(72) Inventors: Matthias Leberle, Kassel (DE);
Markus Baum, Witzenhausen (DE);
Gerd Stöhr, Wesendorf (DE); Joachim Prokscha, Kassel (DE)

(73) Assignee: VOLKSWAGEN AB, Wolfsburg (DE)

( * ) Notice: Subject to any disclaimer, the term of this patent is extended or adjusted under 35 U.S.C. 154(b) by 113 days.

(21) Appl. No.: 14/396,022

(22) PCT Filed: Apr. 2, 2013

(86) PCT No.: PCT/EP2013/056847
§ 371 (c)(1),
(2) Date: Oct. 21, 2014

(87) PCT Pub. No.: WO2013/156295
PCT Pub. Date: Oct. 24, 2013

(65) Prior Publication Data
US 2015/0130302 A1    May 14, 2015

(30) Foreign Application Priority Data
Apr. 21, 2012  (DE) .................. 10 2012 008 209

(51) Int. Cl.
*H02K 3/00* (2006.01)
*H02K 9/197* (2006.01)
(Continued)

(52) U.S. Cl.
CPC .............. *H02K 9/197* (2013.01); *H02K 5/20* (2013.01); *H02K 9/00* (2013.01); *H02K 9/19* (2013.01)

(58) Field of Classification Search
CPC  H02K 5/20; H02K 9/197; H02K 9/19; H02K 9/00; H02K 9/08; H02K 9/12; H02K 9/14; H02K 9/16; H02K 9/193
(Continued)

(56) References Cited

U.S. PATENT DOCUMENTS 2,862,120 A * 11/1958 Onsrud .................. H02K 5/20
165/146
3,521,094 A * 7/1970 Widder .................. H02K 9/19
310/58
(Continued)

FOREIGN PATENT DOCUMENTS

DE         196 24 519        1/1998
DE    10 2007 011 699       10/2007
(Continued)

OTHER PUBLICATIONS

International Search Report, dated Sep. 16, 2014, issued in corresponding International Application No. PCT/EP2013/056847.

*Primary Examiner* — Michael Andrews
*Assistant Examiner* — Maged Almawri
(74) *Attorney, Agent, or Firm* — Andrews Kurth Kenyon LLP

(57) ABSTRACT

In an electrical machine for the hybrid drive of a vehicle, an annular cooling jacket extends between a housing and a casing. The cooling jacket is connected to a coolant inlet and a coolant outlet so that coolant is axially introduced into the cooling jacket. The coolant inlet and the coolant outlet are situated next to each other in the circumferential direction of the housing and are hydraulically connected to a deflection section by way of coolant ducts. Coolant introduced into the cooling jacket flows in two partial flows in opposite directions, to the deflection section through coolant ducts forming an intake. The coolant is deflected back to the coolant outlet through a coolant duct forming a return. The coolant flows
(Continued)

through the coolant duct of the return and the axially adjacent coolant duct of the intake in opposite directions.

6 Claims, 2 Drawing Sheets

(51) Int. Cl.
*H02K 5/20* (2006.01)
*H02K 9/00* (2006.01)
*H02K 9/19* (2006.01)

(58) Field of Classification Search
USPC .................................. 310/54, 89, 52, 60 A
See application file for complete search history.

(56) References Cited

U.S. PATENT DOCUMENTS

| | | | | |
|---|---|---|---|---|
| 3,863,083 A * | 1/1975 | Jaeschke | ................... | G01L 3/22 310/105 |
| 4,346,361 A * | 8/1982 | Sauer | ...................... | H01F 27/10 336/60 |
| 5,616,973 A * | 4/1997 | Khazanov | ................ | H02K 5/20 310/54 |
| 5,664,916 A * | 9/1997 | Link | ........................ | B23Q 1/70 310/54 |
| 6,300,693 B1 * | 10/2001 | Poag | ........................ | H02K 5/20 310/54 |
| 6,577,027 B2 * | 6/2003 | Hayase | ................... | H01F 27/10 310/52 |
| 6,900,561 B2 * | 5/2005 | Vlemmings | ............. | H02K 5/20 310/58 |
| 6,909,210 B1 * | 6/2005 | Bostwick | ................ | H02K 5/20 310/254.1 |
| 7,545,060 B2 | 6/2009 | Ward | | |
| 7,633,194 B2 | 12/2009 | Dawsey et al. | | |
| 7,675,209 B2 * | 3/2010 | Masoudipour | ........... | H02K 5/20 310/57 |
| 8,049,384 B2 | 11/2011 | Wilton et al. | | |
| 2002/0024262 A1 * | 2/2002 | Hayase | ................... | H01F 27/10 310/59 |
| 2005/0268464 A1 * | 12/2005 | Burjes | ....................... | F28F 3/12 29/890.035 |
| 2008/0223557 A1 | 9/2008 | Fulton et al. | | |
| 2010/0007227 A1 * | 1/2010 | Smith | ...................... | H02K 5/20 310/64 |
| 2010/0194233 A1 * | 8/2010 | Wu | .......................... | H02K 1/20 310/214 |
| 2011/0168356 A1 * | 7/2011 | Knight | ..................... | H02K 5/20 165/104.19 |
| 2011/0234029 A1 * | 9/2011 | Pal | ........................... | H02K 1/20 310/54 |
| 2012/0025638 A1 * | 2/2012 | Palafox | ..................... | H02K 3/24 310/52 |
| 2012/0080965 A1 | 4/2012 | Bradfield | | |
| 2012/0217826 A1 * | 8/2012 | Jiang | ........................ | H02K 5/20 310/54 |
| 2013/0126143 A1 * | 5/2013 | Sheu | ......................... | F28F 1/00 165/177 |
| 2013/0328423 A1 * | 12/2013 | Ikeda | ....................... | H02K 9/19 310/54 |
| 2014/0069099 A1 * | 3/2014 | Rohwer | .................... | H02K 5/20 60/714 |

FOREIGN PATENT DOCUMENTS

| | | |
|---|---|---|
| DE | 10 2007 048 683 | 4/2008 |
| DE | 10 2008 040 917 | 2/2010 |
| DE | 10 2010 023 948 | 1/2011 |
| DE | 11 2011 103 345 T5 | 7/2013 |

* cited by examiner

COOLING JACKET FOR AN ELECTRIC MOTOR OR GENERATOR HAVING COOLANT INLET AND OUTLETS WITH OPPOSITE FLOW DIRECTION STREAMS

CROSS REFERENCE TO RELATED APPLICATIONS

The present application claims priority to Application No. 10 2012 008 209.6, filed in the Federal Republic of Germany on Apr. 21, 2012, which is expressly incorporated herein in its entirety by reference thereto.

FIELD OF THE INVENTION

The present invention relates to an electrical machine, especially for the hybrid drive of a vehicle, which has a housing and a casing that concentrically encloses the housing. An annular cooling jacket, through which a coolant can flow and which is sealed in a fluid-tight manner, is situated between the housing and the casing.

BACKGROUND INFORMATION

Electrical machines are employed as motors or generators in various technical fields. They usually have a stationary stator as well as a rotationally mounted rotor or impeller and produce waste heat while in operation, which can considerably limit the efficiency and service life of the electrical machine.

Cooling is required in particular for electric machines that have high power density and is realized either with the aid of air or a coolant. Cooling by air requires large surfaces for the effective dissipation of the waste heat produced in the electrical machine, so that the housings must have corresponding dimensions. However, electric drives that are used in a motor vehicle or a rail car for its electrical driving operation, for instance, need to have the most compact design possible in order to optimize the available space. As a result, air cooling is usually not an option for such electric drives.

Cooling jackets through which a fluid is circulated are utilized in order to increase the output and actively cool electrical machines of these types. The currently known cooling approaches for electrical machines are based on radial or axial flows of a fluid coolant through a cooling jacket or a cooling line. The coolant withdraws the waste heat from the electrical machine, so that a fault-free operation is able to be ensured at a high power level. A mixture of water and glycol or oil or some other suitable cooling liquid is frequently used as coolant. The coolant ducts, for example, run parallel to a longitudinal axis of a housing, which in turn lies parallel to a shaft driven by the electrical drive. The coolant ducts, frequently implemented as drill holes, may be distributed across the circumference of the housing, which results in a correspondingly large housing that nevertheless provides only a limited amount of cooling surface. A diversion of the coolant from one coolant duct to another adjacent coolant duct occurs mostly on the face of the electrical machine or of the housing of the electrical machine, in a separate housing part that is connected to the housing. This additionally enlarges the dimensions of the electrical machine. Moreover, expensive sealing between the housing components is required in this case in order to effectively prevent a short circuit caused by coolant that penetrates the housing interior. This is of particular importance when the electrical machine is operated at high powers. An electrical machine used in a motor vehicle is often operated at voltages of up to 800 V and currents approaching 400 A.

An electrical machine that has an annular cooling jacket which radially surrounds the electrical machine is described in German Published Patent Application No. DE 10 2008 040 917 A1, in which liquid coolant is introduced into the cooling jacket via a radially situated coolant inlet and discharged from the cooling jacket again via a coolant outlet that is likewise radially positioned and offset by 180° in relation to the coolant inlet in the circumferential direction of the cooling jacket. Since the coolant inlet or outlet radially projects from the housing, considerable additional space is required for the electrical machine, which is disadvantageous especially given crowded conditions, e.g., in motor vehicles.

Another device for cooling laminated stator cores of electrical machines is described in German Published Patent Application No. DE 10 2007 048 683 A1, in which liquid coolant is introduced into a cooling jacket surrounding the stator, into a plurality of coolant ducts that are evenly distributed along the circumference, and routed out of the cooling jacket in the axial direction by way of two outlets disposed on the end faces of the stator.

German Published Patent Application No. DE 10 2007 011 699 A1, describes a device for heat dissipation of an electrical machine developed as an electromotor, which is provided with a cooling jacket situated between a stator and a housing in the form of a ring. A suitable liquid coolant circulates in the cooling jacket and withdraws the waste heat that is produced during the operation from the electrical machine.

A similar electrical machine, likewise developed as electromotor, is described in German Published Patent Application No. DE 10 2010 023 948 A1, in which to cool the electrical machine, a cooling cavity, which is connected to two ports, is provided and the ports are utilized to supply liquid coolant to the cooling cavity or to remove it from there.

U.S. Patent Application Publication No. 2008/0223557 A1 describes a fluid-cooling system of an electrical machine. The electrical machine has a cooling cavity for the discharge of waste heat, to which coolant is supplied via a radially situated inlet opening and from which coolant is discharged by way of a likewise radially situated outlet opening. Because of the inlet connection, which extends in the radial direction, and the adjacently situated and also radially extending outlet connection at the circumference, more space is required for the electrical machine, which is not available in motor vehicles, in particular.

In this context, example embodiments of the present invention are based on the objective of providing effective cooling for an electrical machine having compact outer dimensions.

SUMMARY

Example embodiments of the present invention therefore provide an electrical machine, especially for the hybrid drive of a vehicle, which has a housing and a casing that concentrically surrounds the housing. An annular cooling jacket, which is sealed in a fluid-tight manner and allows a coolant to pass through, extends between the housing and the casing, the cooling jacket being connected to at least one coolant inlet and at least one coolant outlet, in such a way that the coolant is able to be axially introduced into the cooling jacket and discharged from there, the coolant inlet and coolant outlet being situated adjacently in the circumferential direction. Coolant ducts extending in the circumferential direction hydraulically connect them to a deflection section which is situated diametrically opposite the coolant inlet, and coolant introduced into the cooling jacket is flowing to the deflection section, in two partial streams having opposite flow directions, through coolant ducts forming a supply, and diverted in such a way that the coolant is flowing back to the coolant outlet through at least one coolant duct forming a return, the at least one coolant duct of the return and the axially adjacent coolant duct of the supply being traversable by the flow in opposite directions.

As a result of the parallelized guidance of the coolant within the sealed cooling jacket according to example embodiments of the present invention, and the axial placement of the connections for the coolant, an advantageous flow around the stator of the electrical machine to be cooled may be ensured in a small space. In addition, the axial introduction and discharge of the coolant into or out of the cooling jacket makes it possible to place both the coolant inlet and the coolant outlet axially on the housing of the electrical machine, i.e., next to each other. This results in better utilization of the available space, e.g., for peripheral components. Moreover, so-called 180° cooling can be realized according to example embodiments of the present invention, in which the coolant, in two partial flows, flows around only one half of the circumference of the housing of the electrical machine. In contrast to 360° cooling, in which the coolant flows around the full circumference of the housing, 180° cooling has considerable advantages, especially with regard to the cooling power, the cooling power distribution, and the cooling effect.

According to example embodiments of the present invention, the deflection section makes it possible to deflect the coolant into two partial flows having opposite flow directions, and the two partial flows are able to be routed to the at least one coolant outlet through associated coolant ducts of the return. For example, the deflection of the coolant may be carried out by means of one or more guidance element(s), which deflect(s) the flow direction of the two partial flows of coolant coming from the coolant inlet by 180° and allows them to flow back to the coolant outlet. The guide element may be developed in such a way that turbulence in the deflection is prevented, so that the coolant flow is not adversely affected. Such a development therefore ensures especially effective cooling of the housing, or the stator of the electrical machine situated in the housing, in a manner that is optimized with regard to space.

Compact development of the electrical machine is also achieved in that the return may include at least two coolant ducts, which are disposed in a common axial plane and connected to a separate coolant outlet in each case, the coolant inlet being disposed between the two coolant outlets in the circumferential direction.

The waste heat produced when the electrical machine is in operation is dissipated in an especially effective manner in that the intake and/or the return may have at least two or more coolant ducts disposed next to each other in the axial direction. The coolant ducts may be formed by fins or webs machined into the housing or connected to or fixed in place on a peripheral area of the housing. In the radial direction, the coolant ducts are delimited by the cylindrical casing that concentrically surrounds the housing. In addition, the casing concentrically surrounding the housing may be connected to the housing in a fluid-tight manner. Toward this end, webs may be provided in the edge regions of the housing, which contact the casing in a sealing manner and are developed as circumferential webs in the form of a ring; the coolant inlet and the coolant outlet(s) infiltrate the circumferential web that seals the cooling jacket in order to introduce the coolant into the cooling jacket or to remove it from there.

An even distribution of the coolant introduced into the cooling jacket to the juxtaposed coolant ducts constituting the intake may be achieved by assigning an intake section to the at least one coolant inlet, which extends in the axial direction and is hydraulically connected to the coolant ducts of the intake that run along both sides of the intake section in the circumferential direction. The coolant streaming into the cooling jacket is thereby evenly distributed to the coolant ducts disposed adjacently in the axial direction and along both sides of the intake section, so that the housing, and thus the stator, are evenly cooled. The intake section is developed as distributor duct and may have a flow-optimizing design and/or include one or more guide element(s) for the better distribution of the coolant to the coolant ducts.

According to an example embodiment, a fluid-tight blocking device is provided between the coolant inlet and the two coolant outlets adjacently disposed in the circumferential direction. This prevents the coolant introduced into the coolant jacket from leaving the cooling jacket again through the coolant outlet without flowing through the coolant ducts, and the coolant flowing toward the coolant outlet in the return from mixing with the incoming coolant. At the same time, the blocking element reroutes the coolant flowing in the circumferential direction through the return in the direction of the coolant outlet, into the axial direction, so that it is able to be discharged out of the cooling jacket in the axial direction through the coolant outlet.

Another feature according to an example embodiment is that the deflection section may extend in the axial direction and hydraulically connect the coolant ducts of the intake and the coolant ducts of the return, the deflection section including a guide element that deflects the coolant and subdivides the deflection section into two flow regions that are separated in a fluid-tight manner. The two partial flows of the coolant entering the deflection section from the intake section are thereby deflected by 180° in the individual flow region, so that the two partial flows leave the deflection section again in the direction of the individual coolant outlet through the coolant ducts of the return line that are connected to the individual flow region.

Example embodiments of the present invention are described in more detail below with reference to the appended Figures.

DETAILED DESCRIPTION

Figure 1:
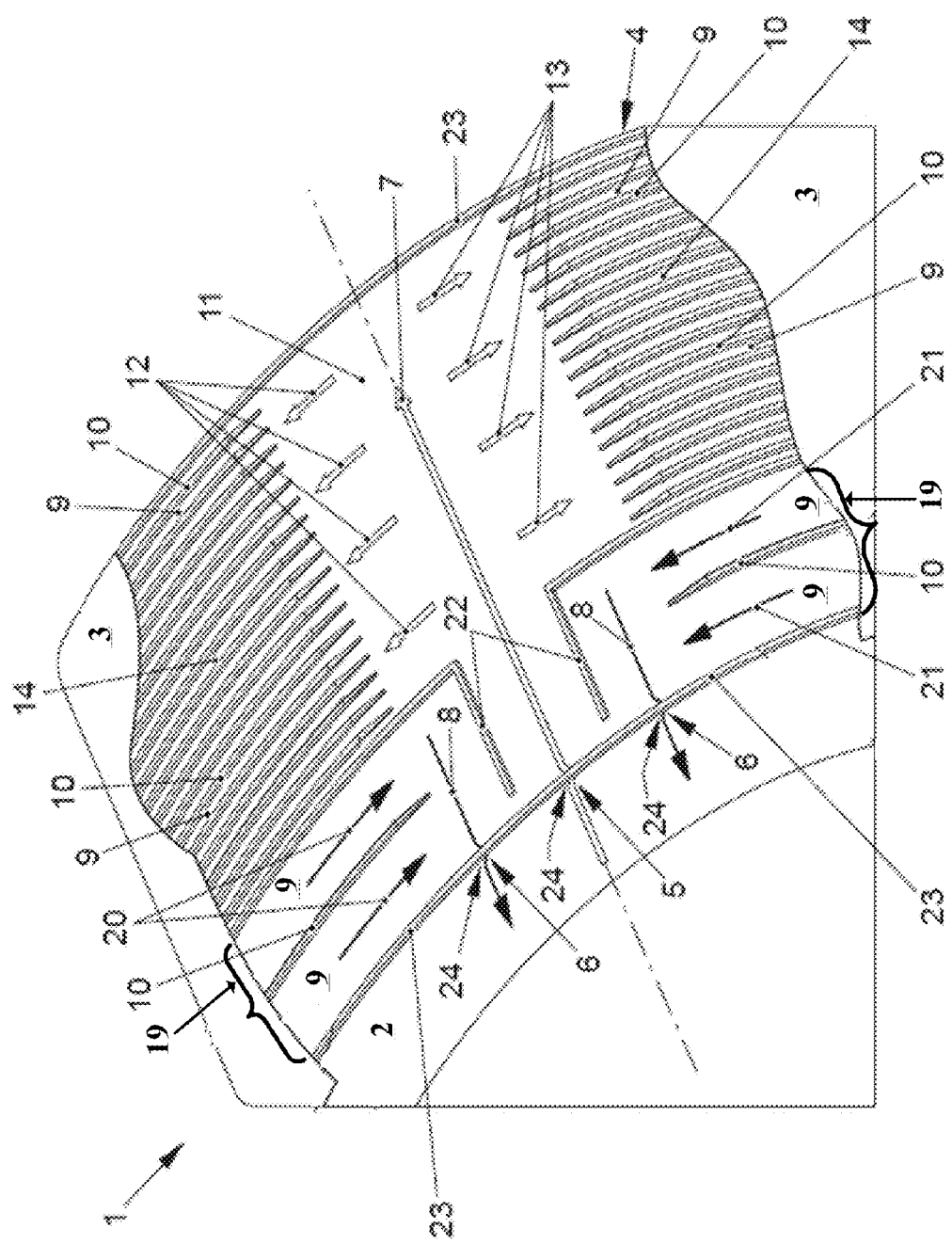
FIG. 1 illustrates an electrical machine having a housing, in a partially sectioned perspective view according to an example embodiment.
Figure 2:
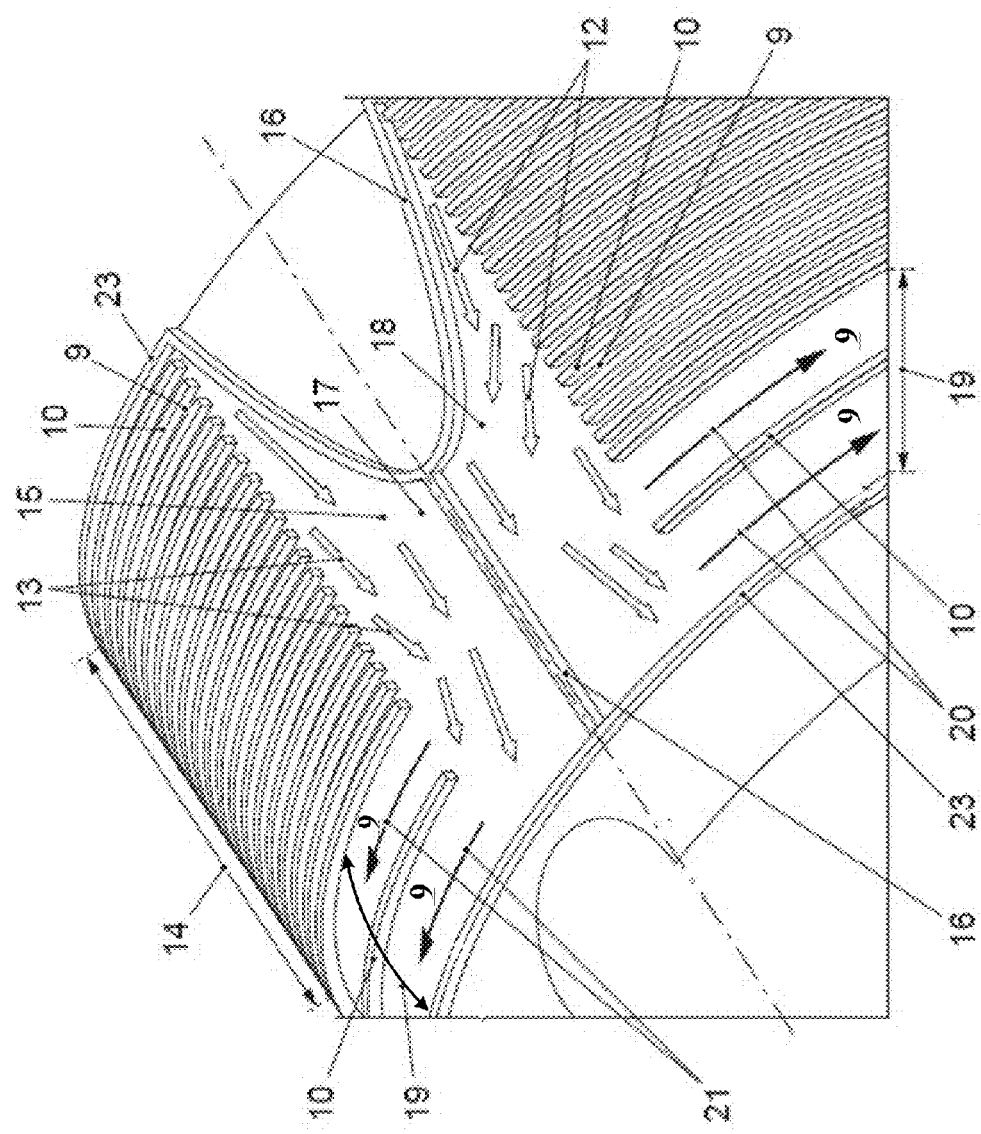
FIG. 2 is an illustration, rotated by 180°, of the electrical machine shown in FIG. 1.

FIG. 1 shows an electrical machine 1, especially for the hybrid drive of a vehicle, having a cylindrical housing 2 that accommodates a stator (not shown). FIG. 2 shows an illustration of electrical machine 1 shown in FIG. 1 in a view that is rotated by 180° about a longitudinal axis of electrical machine 1.

Cylindrical housing 2 of electrical machine 1 is furthermore enclosed by a sleeve-shaped casing 3 on the outside, in such a way that an annular cooling jacket 4 is developed between housing 2 and casing 3, the cooling jacket being sealed in a fluid-tight manner and able to be traversed by a coolant. Cooling jacket 4 is linked to a coolant inlet 5 and two coolant outlets 6, through which the coolant is axially introduced into cooling jacket 4 and also axially dischargeable from cooling jacket 4. The axial introduction of the coolant into cooling jacket 4 through coolant inlet 5 is illustrated by a directional arrow 7, and the axial discharging of the coolant from coolant jacket 4 through coolant outlets 6 is indicated by two directional arrows 8 in FIG. 1. Coolant inlet 5 and the two coolant outlets 6 are situated next to each other in the circumferential direction of housing 2, the two coolant outlets 6 accommodating coolant inlet 5 between them. Coolant outlets 6 and coolant inlet 5 may be equipped with pipe or hose connections, which are not shown in the two figures.

Cooling jacket 4 has a plurality of coolant ducts 9, which are situated next to each other in the axial direction, extend in the circumferential direction of housing 2, and are formed between fins 10 situated or fixed in place on the outer surface of housing 2. It is also possible that fins 10 are introduced into the outer surface of housing 2 or are situated on the inner surface of casing 3 surrounding housing 2.

Coolant inlet 5 is hydraulically connected to an axially extending intake section 11, which evenly distributes the coolant axially introduced into cooling jacket 4 in two partial flows 12, 13 having opposite flow directions, to coolant ducts 9 that are situated along both sides of intake section 11 and form an intake 14.

Via coolant ducts 9 of intake 14, intake section 11 or coolant inlet 5 are connected to a deflection section 15, which lies diametrically opposed and is shown in FIG. 2. Deflection section 15 running in the axial direction has a guide element 16 for diverting the incoming coolant, i.e., the two partial flows 12, 13. Guide element 16 subdivides deflection section 15 into two flow regions 17, 18, which are separated from each other in a fluid-tight manner. The two flow regions 17, 18 are linked to one of the two coolant outlets 6 via coolant ducts 9 forming a return 19.

The coolant flowing through coolant ducts 9 of intake 14 into deflection section 15 or the two flow regions 17, 18 of deflection section 15 is rerouted into two partial flows 20, 21 having opposite flow directions in the region of deflection section 15, especially by guide element 16, and guided through coolant ducts 9 of return 19 to the individual coolant outlet 6. Coolant ducts 9 of intake 14 and coolant ducts 9 of return 19 are traversed in opposite directions.

A fluid-tight blocking device 22 is provided between coolant inlet 5 and the two coolant outlets 6 situated next to each other in the circumferential direction. Blocking device 22 ensures that the coolant introduced into cooling jacket 4 is routed to coolant ducts 9 of intake 14. At the same time, blocking device 22 ensures that the coolant flowing through return line 19 in the direction of coolant outlets 6 and in the circumferential direction is rerouted in the axial direction, so that it is able to be discharged from cooling jacket 4 through coolant outlets 6.

As already described, casing 3, which concentrically surrounds housing 2, is connected to housing 2 in a fluid-tight manner. Annular and circumferentially developed webs 23 are provided for this purpose in the edge regions of housing 2, which sealingly contact an inner surface of casing 3 and thereby seal cooling jacket 4 in the axial direction in a fluid-tight manner. A duct 24, such as a perforation or bore hole, which infiltrates web 23, is provided for the supply of coolant or the discharge of coolant into or out of the cooling jacket.

LIST OF REFERENCE NUMERALS 1 electrical machine
2 housing
3 casing
4 cooling jacket
5 coolant inlet
6 coolant outlet
7 directional arrow
8 directional arrow
9 coolant duct
10 fin
11 intake section
12 partial flow
13 partial flow
14 intake
15 deflection section
16 guide element
17 flow region
18 flow region
19 return
20 partial flow
21 partial flow
22 blocking device
23 web
24 duct

What is claimed is:

1. An electrical machine for a hybrid vehicle, comprising:
a housing;
a casing that concentrically surrounds the housing;
an annular cooling jacket that is sealed in a fluid-tight manner and allows a coolant to pass through, extending between the housing and the casing;
at least one coolant inlet and at least one coolant outlet situated adjacently in the circumferential direction of the housing;
an intake section connected to the at least one coolant inlet, wherein the intake section extends in the axial direction;
a deflection section situated diametrically opposite the at least one coolant inlet and the intake section, wherein the deflection section extends in the axial direction;
wherein the cooling jacket is connected to the at least one coolant inlet and to the at least one coolant outlet so that coolant is axially introduced into the cooling jacket via the at least one coolant inlet and the axially-extending intake section and discharged via the at least one coolant outlet;
wherein the at least one coolant inlet, the axially-extending intake section, and the at least one coolant outlet are hydraulically connected to the deflection section by coolant ducts that (i) extend in the circumferential direction and (ii) are adjacent to one another in the axial direction;
wherein coolant introduced into the cooling jacket flows to the deflection section in two partial flows having opposite flow directions, through the coolant ducts forming a supply, wherein (i) a first partial flow in a first flow direction occurs through a first set of multiple adjacent coolant ducts connecting a first side of the axially-extending intake section to a first side of the axially-extending deflection section, (ii) a second partial flow in a second flow direction occurs through a second set of multiple adjacent coolant ducts connecting a second side of the axially extending intake section to a second side of the axially-extending deflection section, and (iii) the first and second sets of multiple adjacent coolant ducts extend in the circumferential direction; and wherein the first partial flow is deflected by the first side of the deflection section to form a first rerouted partial flow, and the second partial flow is deflected by the second side of the deflection section to form a second rerouted partial flow, so that the first rerouted partial flow flows back to the at least one coolant outlet in an opposite direction of the first flow direction through at least one coolant duct forming a first return, and the second rerouted partial flow flows back to the at least one coolant outlet in an opposite direction of the second flow direction through at least one further coolant duct forming a second return, wherein (i) the at least one coolant duct forming the first return is adjacent to the first set of multiple adjacent coolant ducts in the axial direction and (ii) the at least one coolant duct forming the second return is adjacent to the second set of multiple adjacent coolant ducts in the axial direction.

2. The electrical machine according to claim 1, wherein at least one of the first return and the second return comprises at least two parallel coolant ducts.

3. The electrical machine according to claim 1, further comprising a fluid-tight blocking device between the at least one coolant inlet and the at least one coolant outlet situated adjacently in the circumferential direction.

4. The electrical machine according to claim 1, wherein the first return and the second return are each connected to a separate coolant outlet.

5. The electrical machine according to claim 4, wherein the at least one coolant inlet is disposed between the two coolant outlets in the circumferential direction.

6. The electrical machine according to claim 5, wherein the coolant ducts forming the first and second returns are situated axially closer than the coolant ducts forming the supply to the at least one coolant inlet and the two coolant outlets.

* * * * *

UNITED STATES PATENT AND TRADEMARK OFFICE
CERTIFICATE OF CORRECTION

PATENT NO. : 9,819,247 B2
APPLICATION NO. : 14/396022
DATED : November 14, 2017
INVENTOR(S) : Leberle et al.

Page 1 of 1

It is certified that error appears in the above-identified patent and that said Letters Patent is hereby corrected as shown below:

On the Title Page

Item "(73) Assignee", change:
"VOLKSWAGEN AB" to --VOLKSWAGEN AG--

Signed and Sealed this
Twentieth Day of February, 2018

Andrei Iancu
*Director of the United States Patent and Trademark Office*